US006887087B2

(12) United States Patent
Lai et al.

(10) Patent No.: US 6,887,087 B2
(45) Date of Patent: May 3, 2005

(54) ELECTRICAL CARD CONNECTOR HAVING SHUTTER MECHANISM

(75) Inventors: Jung Chieh Lai, Tu-Chen (TW); Ming-Lun Kuo, Tu-Chen (TW)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 0 days.

(21) Appl. No.: 10/659,544

(22) Filed: Sep. 9, 2003

(65) Prior Publication Data

US 2004/0248443 A1 Dec. 9, 2004

(30) Foreign Application Priority Data

Jun. 6, 2003 (TW) ........................... 92210436 U

(51) Int. Cl.[7] .......................................... H01R 13/447
(52) U.S. Cl. .................................................. 439/138
(58) Field of Search ............................. 439/138, 139, 439/142

(56) References Cited

U.S. PATENT DOCUMENTS

| | | | | |
|---|---|---|---|---|
| 6,095,862 A | * | 8/2000 | Doye et al. | 439/138 |
| 6,120,322 A | * | 9/2000 | Ho et al. | 439/541.5 |
| 6,269,005 B1 | * | 7/2001 | Tung et al. | 439/138 |
| 6,368,123 B2 | | 4/2002 | Uchiyama et al. | 439/138 |

* cited by examiner

Primary Examiner—Renee Luebke
(74) Attorney, Agent, or Firm—Wei Te Chung

(57) ABSTRACT

An electrical card connector (1) includes a terminal module (12), a shell (13), an ejector (14) and a shutter mechanism (15). The terminal module includes an insulative housing (121) and a number of terminals (122) received in the insulative housing. The shell is assembled to the terminal module and includes a cover (131) and a pair of lateral walls (132, 133) extending from opposite sides of the cover (131). The ejector is assembled to the lateral wall (133) of the shell. The shutter mechanism is away from the terminal module and includes a mounting member (151) assembled to the ejector and the shell and a door member (17). The door member is pivotally assembled to the mounting member.

11 Claims, 5 Drawing Sheets

US 6,887,087 B2

ELECTRICAL CARD CONNECTOR HAVING SHUTTER MECHANISM

BACKGROUND OF THE INVENTION

1. Field of the Invention

The present invention generally relates to an electrical card connector, and particularly to an electrical card connector having a shutter mechanism for dust-proof.

2. Description of Prior Arts

With the development of portable computer, the dimension of the portable computer gets more and more smaller so that the computer need more memory cards to meet the requirement. The electrical card connectors are widely used in the portable computer. However, the portable computer is often used in open air, the dust may enter into the interior of the portable computer through the opening of the electrical card connector, too much dust influences the work of the portable computer, and even shortens the life of the portable computer. Accordingly, the electrical card connector always has a shutter mechanism for preventing the dust from entering into the interior of the portable computer.

U.S. Pat. No. 6,368,123 discloses an electrical card connector having a shutter mechanism for dust-proof. The electrical card connector comprises a guiding frame, a pair of shutter mechanisms, a support frame composed of an upper frame and a lower frame and a pair of mounting pieces. The shutter mechanisms are assembled to the upper frame and the lower frame of the support frame, respectively. The mounting pieces extend backwardly from opposite ends of the support frame respectively, and the mourning pieces are mounted to the mounting holes of the guiding frame of the electrical card connector. The mounting pieces are very slim and are easily deformed. Additionally, the mounting pieces are retained to the shell by screws, the process of assembly is relatively complicated.

Hence, it is desirable to have an improved connector to overcome the above-mentioned disadvantages of the prior art.

BRIEF SUMMARY OF THE INVENTION

Accordingly, it is an object of the present invention to provide an electrical card connector which has a shutter mechanism with a simple structure and easily assembled to the electrical card connector.

In order to achieve the above-mentioned objects, an electrical card connector includes a terminal module, a shell, an ejector and a shutter mechanism. The terminal module comprises an insulative housing and a plurality of terminals received in the insulative housing. The shell is assembled to the terminal module and comprises a cover and a pair of lateral walls extending from opposite sides of the cover. The ejector is assembled to the lateral wall of the shell. The shutter mechanism is away from the terminal module and includes a mounting member and a door member. The mounting member includes a pair of arms. One of the arms is assembled to the ejector, and the other of the arms is assembled to the lateral wall of the shell. The arms define a pair of holes and the door member includes a pair of posts pivotally received in the holes and a base portion rotatable about the post Other objects, advantages and novel features of the invention will become more apparent from the following detailed description of the present embodiment when taken in conjunction with the accompanying drawings.

DETAILED DESCRIPTION OF THE PREFERRED EMBODIMENT

Figure 1:
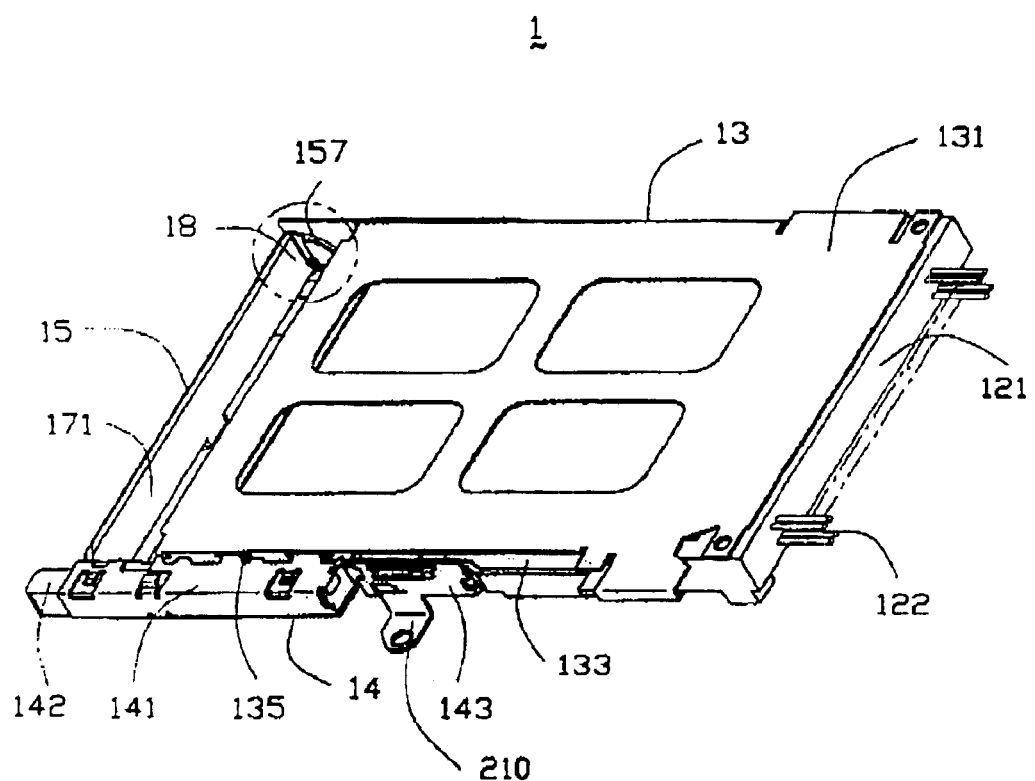
FIG. 1 is a perspective view of an electrical card connector in accordance with the present invention.

Reference will now be made to the drawing figures to describe the present invention in detail.

Figure 2:
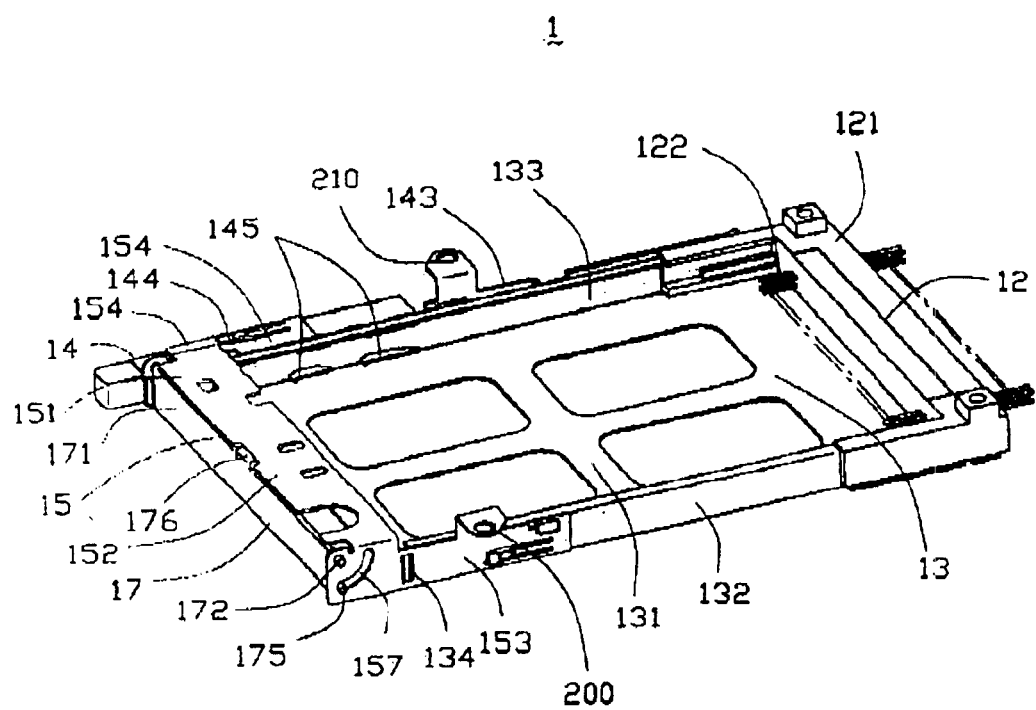
FIG. 2 is another perspective view of the electrical card connector shown in FIG. 1.
Figure 3:
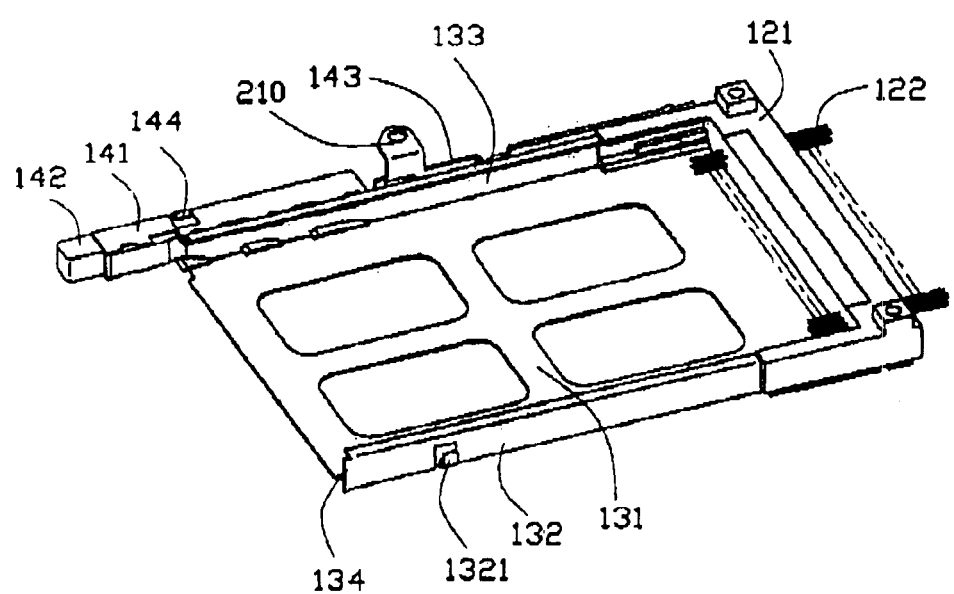
FIG. 3 is a view similar to FIG. 2 but a shutter mechanism of the electrical card connector is not shown.

With reference to FIGS. 1–3, an electrical card connector 1 comprises a terminal module 12, a shell 13, an ejector 14 and a shutter mechanism 15.

The terminal module 12 comprises an insulative housing 121 and a plurality of terminals 122 retained to the insulative housing 121. The shell 13 comprises a cover 131 and a pair of lateral walls 132, 133 extending downwardly from the cover 131. The lateral wall 133 defines a plurality of retaining ports 135 at the upper and bottom side, the lateral wall 132 is formed with a stopping projection 1321 and a locking tab 134 at the front end thereof. The ejector 14 is assembled to the lateral wall 133 of the shell 13 and comprises a plug 142, an engaging ear 143 for mounting the printed circuit board and a frame 141. The frame 141 has a plurality of retaining pads 145, each is received in corresponding retaining port 135 of the cover 131. The frame 141 of the ejector 14 further comprises a stopping projection 144 thereon. How the ejector 14 works is well known to persons skilled in the pertinent art, so it is not shown in the drawings and not described here. The ejector 14 further defines a standoff 210 on the engaging ear 143 for supportably positioning the connector on a printed circuit board.

Figure 4:
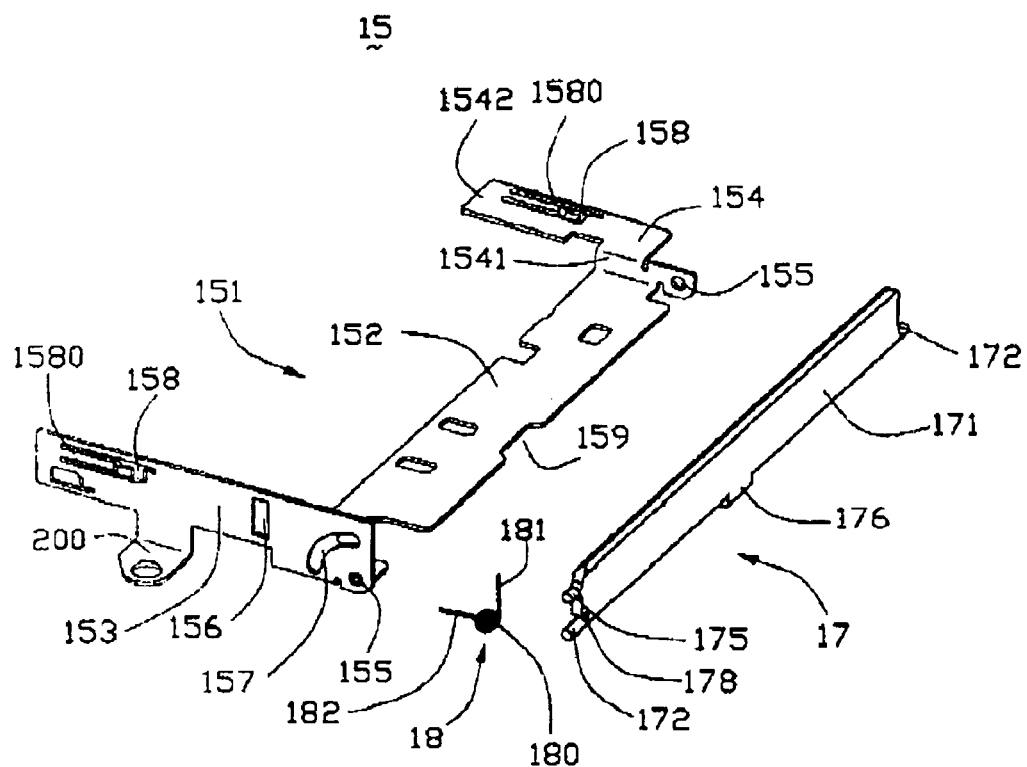
FIG. 4 is an exploded, perspective view of the shutter mechanism.

Reference with FIG. 4, the shutter mechanism 15 comprises a mounting member 151, a door member 17 and a resilient member 18. The mounting member 151 comprises a base plate 152 and a first and a second arm 153, 154. The base plate 152 defines a recess 159 thereon. The first arm 153 vertically extends from one of opposite sides of the base plate 152 and defines an opening 156 corresponding to the locking tab 134. The second arm 154 comprises a vertical part 1541 and a horizontal part 1542 connecting to the vertical part 1541. Each of the first arm 153 and the horizontal part 1541 of the second arm 154 defines a rectangular cutout 158 with a metal spring 1580 therein, respectively. The metal springs 1580, respectively, mate with the stopping projections 1321, 144 of the shell 13 and the ejector 14, whereby, the first arm 153 is retained to the lateral wall 133 of the shell 13, and the second arm 154 is retained to the ejector 14. Each of the first and the second arms 153, 154 defines a hole 155 adjacent to the base plate 152. The first arm 153 defines a track 157 above the hole 155 thereof. The door member 17 is assembled to the first and second arm 153, 154 and comprises a base portion 171, a protrusion 176 at the center of the base portion 171, a pair of posts 172 formed at the opposite ends of the base portion 171, a cutout 178 adjacent to one of the posts 172 and a positioning post 175 above the one of posts 172 movable along the track 157. The base portion 171 defines a cavity 177 (shown in FIG. 5) at the inner face thereof. The cavity 177 and the post 172 of the door member 17 respectively engaging with the resilient member 18. Meantime, the protrusion 176 of the door member 17 is received in the recess 159 of the mounting member 151. The mounting member further defines a standoff 210 for supportably positioning the connector on a printed circuit board.

Figure 5:
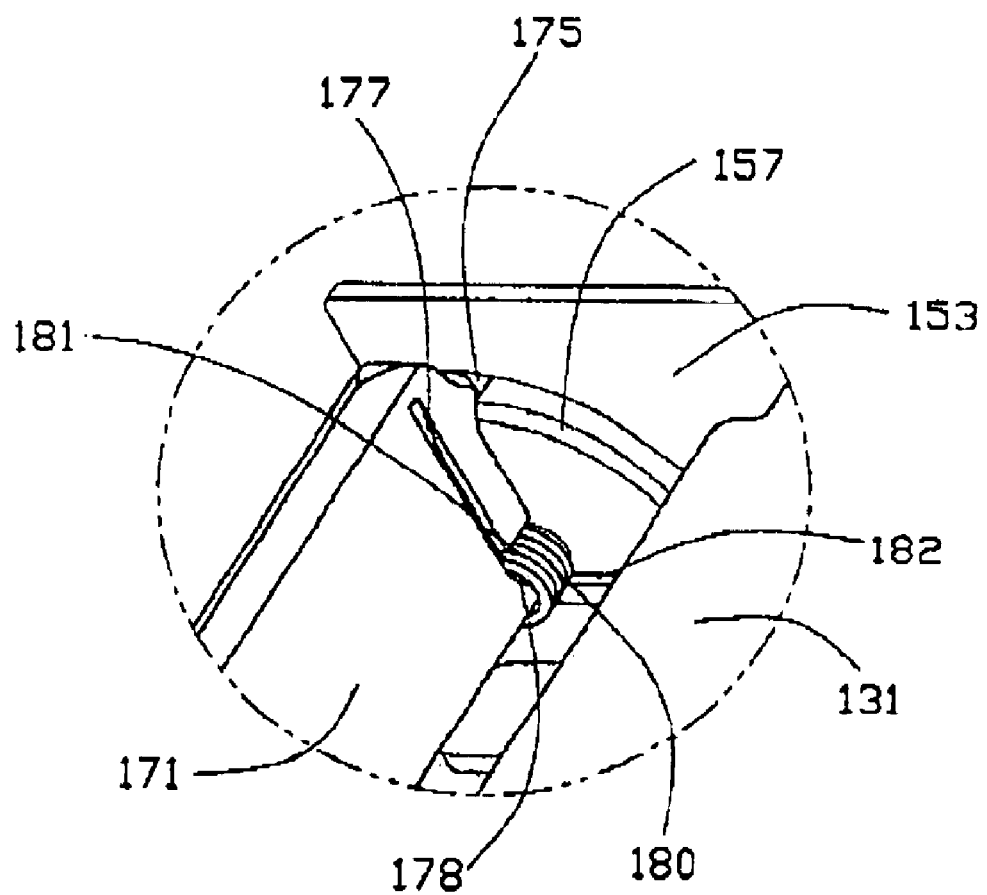
FIG. 5 is a partially enlarged view of the electrical card connector show in FIG. 1.

Reference with FIG. 4 and FIG. 5, the resilient member 18 is preferably a spiral spring and comprises a twisted main body 180, a first finger 181 and a second finger 182 extending from opposite ends of the main body 180, respectively.

During assembly, the resilient member 18 is assembled to the post 172 and received in the cutout 178, the first finger 181 of the resilient member 18 is received in the cavity 177 of the base portion 171, and the second finger 182 engages with the base plate 152 of the mounting member 151. The door member 17 is assembled to the mounting member 151 by the post 172 received in the hole 155 of the base portion 171, and the positioning post 175 movably received in the track 157. The opening 156 of the first arm 153 engages with the locking tab 134, and the rectangular cutout 158 with the metal spring 1581 of the first arm 153 and the horizontal portion of the second arm 154 engage with the stopping projection 144, 1321 of the shell 13 and the ejector 14, whereby the shutter mechanism 15 and other member is assembled together firmly.

When a card (not shown) is inserted into the electrical card connector 1, a front end of the card pushes the door member 17 of the shutter mechanism 15 upwardly, and the positioning post 175 moves along the track 157. When the card is withdrawn from the electrical card connector 1, the door member resume automatically by the resilient member 18. In such a way, dust is kept out of the electrical card connector 1.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. An electrical card connector comprising:
   a terminal module comprising an insulative housing and a plurality of terminals received in the insulative housing;
   a shell assembled to the terminal module and comprising a cover covering the terminal module and a pair of lateral walls extending from opposite sides of the cover;
   an ejector assembled to one of the lateral walls of the shell;
   a shutter mechanism comprising a mounting member assembled to the shell and the ejectors, and a door member pivotally assembled to the mounting member;
   wherein the mounting member comprises a base plate, a first arm and a second arm extending from the base plate, the first arm being retained to the shell and the second arm being retained to the ejector;
   wherein the mounting member further comprises a resilient member comprising a main body, a first finger, and a second finger engaging with the base plate of the mounting member, wherein the door member comprises a base portion engaging with the first finger and a first post extending from the base portion and assembled with the main body;
   wherein the door member comprises a second post, and wherein the first and the second arms of the mounting member define a pair of holes pivotally receiving the first and the second post.

2. The electrical card connector as described in claim 1, wherein the second arm comprises a vertical part and a horizontal part connecting to the vertical part.

3. The electrical card connector as described in claim 1, wherein the other of the lateral walls of the shell is formed with a stopping projection, and wherein the first arm of the mounting member comprises a spring finger engaging with the stopping projection.

4. The electrical card connector as described in claim 1, wherein the ejector comprises a frame formed with a stopping projection, and the second arm of the mounting member is formed with a spring finger engaging with the stopping projection.

5. The electrical card connector as described in claim 1, wherein the door member comprises a third post, and wherein the first arm of the mounting member defines a track movably receiving the third post.

6. The electrical card connector as described in claim 1, wherein the door member comprises a protrusion extending from the base portion, and wherein the mounting member defines a recess corresponding to the protrusion.

7. The electrical card connector as described in claim 1, wherein the lateral wall of the shell is formed with a locking tab, and wherein the first arm of the mounting member defines an opening mating with the locking tab.

8. An electrical card connector comprising:
   an insulative housing;
   a plurality of terminals received in the insulative housing;
   a metallic shell assembled to the housing, said shell comprising a cover plate covering the housing, and a pair of lateral walls extending from opposite sides of the cover;
   an ejector mechanism assembled to one of the lateral walls of the shell; and
   a shutter mechanism comprising a mounting member assembled to at least one of the shell and the ejector mechanism, and a door member pivotally assembled to the mounting member; wherein
   one of said lateral walls defines a standoff on one side of the connector, and the mounting member defines another standoff on the other side of the connector to cooperate with said standoff for supportably positioning the connector on a printed circuit board;
   wherein said mounting member includes a base plate with two opposite side arms extending forwardly from two opposite ends thereof, wherein one of said side arms is located beside one of said lateral walls and the other of said side arms is located beside the other of said lateral walls;
   wherein said cover plate of the shell and said base plate are spaced in from each other in a vertical direction and commonly define a spaced in which an electronic card is received.

9. The electrical card connector as described in claim 8, wherein said door member is located in either a vertical manner to cover an interior of the connector or a horizontal manner closely confronting the base plate in a parallel relation to expose the interior for receiving an electronic card therein.

10. An electrical card connector comprising;

an insulative housing;

a plurality of terminals received in the insulative housing;

a metallic shell assembled to the housing, said comprising a cover plate covering the housing, and a pair of lateral walls extending from opposite sides of the cover, an ejector mechanism assembled to one of the lateral walls of the shell; and a shutter mechanism comprising a mounting member assembled to at least one of the shell and the ejector mechanism, and a door member pivotally assembled to the mounting member, wherein said mounting member is made of one piece and includes a base plate with two opposite side arms extending forwardly from two opposite ends thereof, wherein one of said side arms is located beside one of said lateral walls and the other of said side arms is located beside the other of said lateral walls; wherein said cover plate of the shell and said base plate are spaced from each other in a vertical direction and commonly define a space in which an electronic card is received.

11. The electrical card connector as described in claim 10, wherein said door member is located in either a vertical manner to cover an interior of the connector, or a horizontal manner closely confronting the base plate in a parallel relation to expose the interior for receiving an electronic card therein.

* * * * *